(No Model.)  3 Sheets—Sheet 1.

G. H. CHAPPELL.
MEANS FOR RAISING SUNKEN VESSELS.

No. 551,329.  Patented Dec. 10, 1895.

(No Model.) 3 Sheets—Sheet 2.

G. H. CHAPPELL.
MEANS FOR RAISING SUNKEN VESSELS

No. 551,329. Patented Dec. 10, 1895.

WITNESSES:
H. Graham
Jos. H. Mulans

INVENTOR
George H. Chappell
BY
Geo. H. Graham
ATTORNEY (No Model.) 3 Sheets—Sheet 3.
G. H. CHAPPELL.
MEANS FOR RAISING SUNKEN VESSELS.
No. 551,329. Patented Dec. 10, 1895.
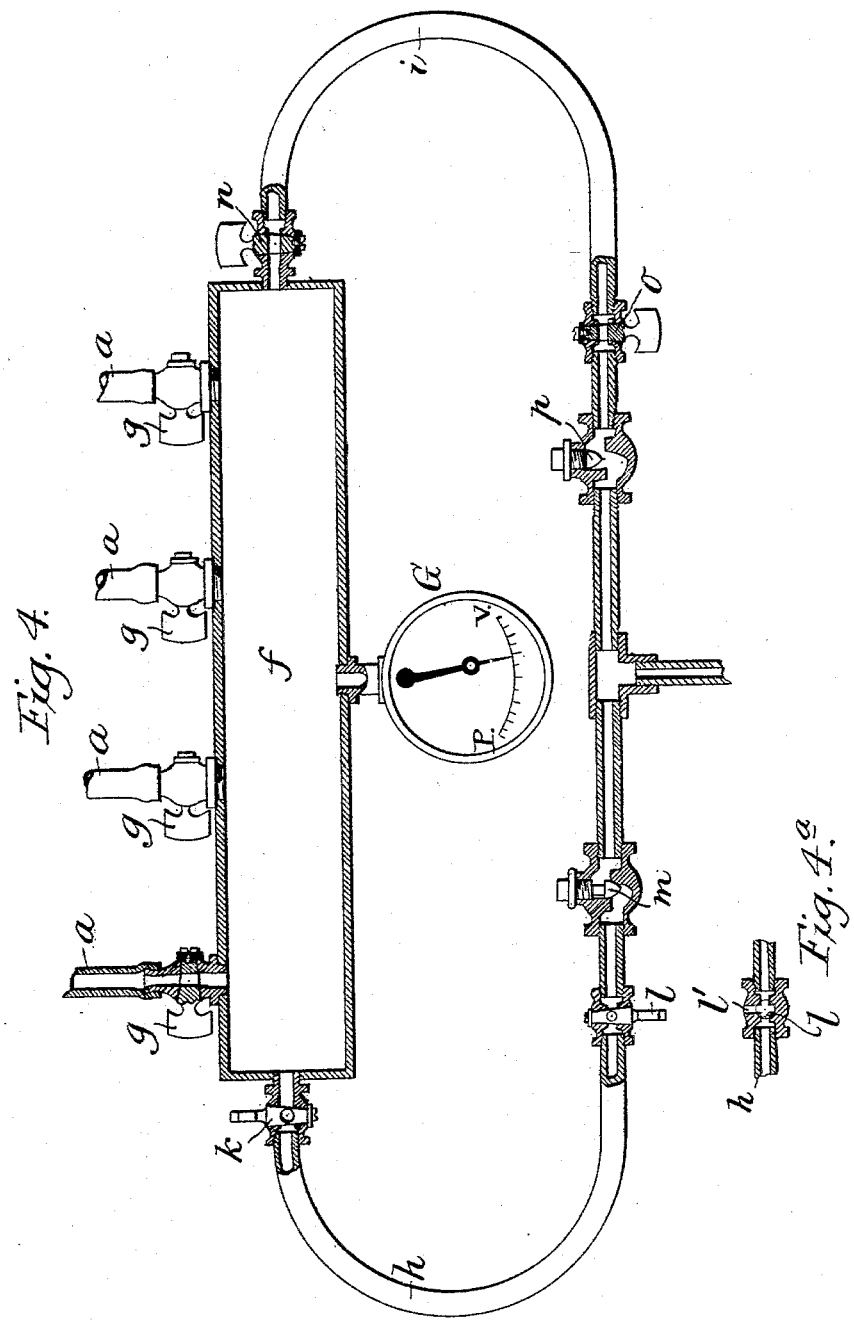
WITNESSES:
W. H. Graham
L. N. Graham
INVENTOR
George H. Chappell
BY
Geo. H. Graham
ATTORNEY

UNITED STATES PATENT OFFICE.

GEORGE H. CHAPPELL, OF NEW YORK, N. Y.

MEANS FOR RAISING SUNKEN VESSELS.

SPECIFICATION forming part of Letters Patent No. 551,329, dated December 10, 1895.

Application filed November 29, 1893. Serial No. 492,364. (No model.)

*To all whom it may concern:*

Be it known that I, GEORGE H. CHAPPELL, a citizen of the United States of America, residing in the city, county, and State of New York, have invented certain new and useful Improvements in Apparatus for Raising Sunken Vessels, of which the following is a specification.

This invention relates generally to a means for raising sunken vessels, boats, and the like to the surface of the water to be repaired or removed, as may be desired; and it consists in the novel method and apparatus hereinafter set forth.

The accompanying drawings illustrate a practical embodiment of an apparatus adapted to carry out the invention, in which—

Figure 1:
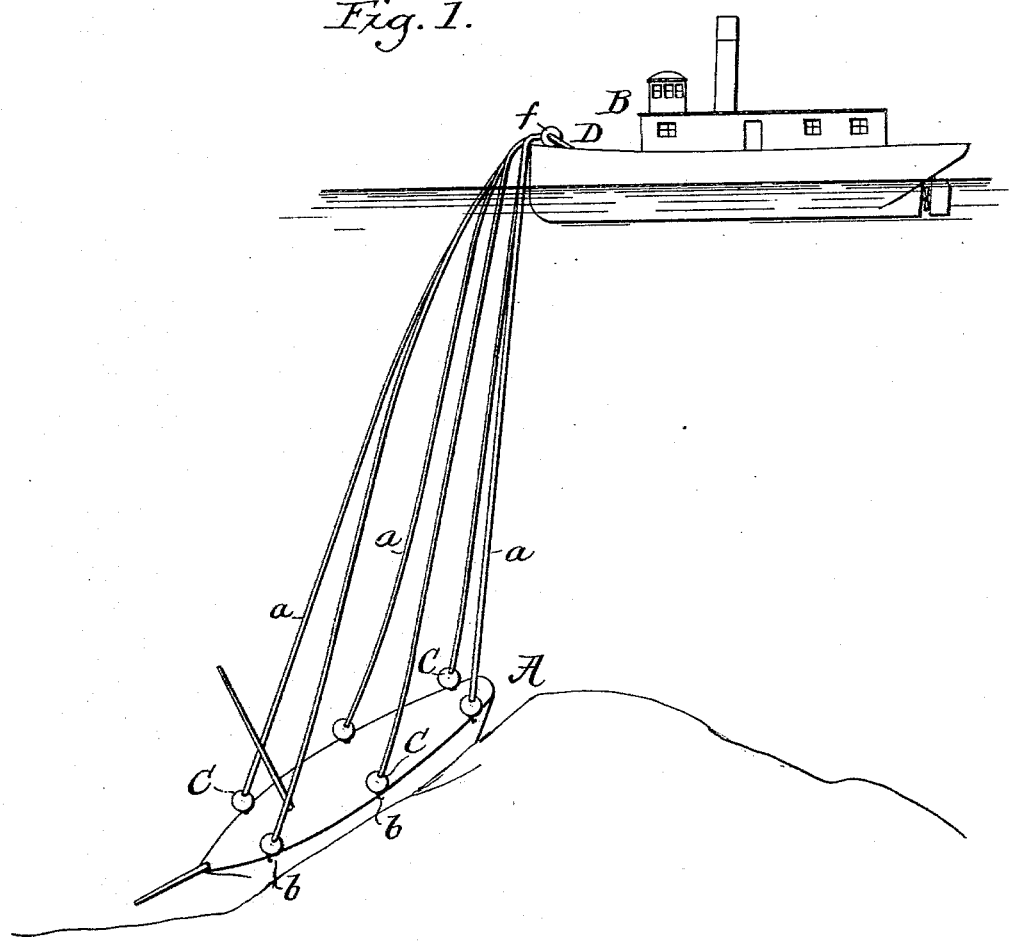
Figure 2:
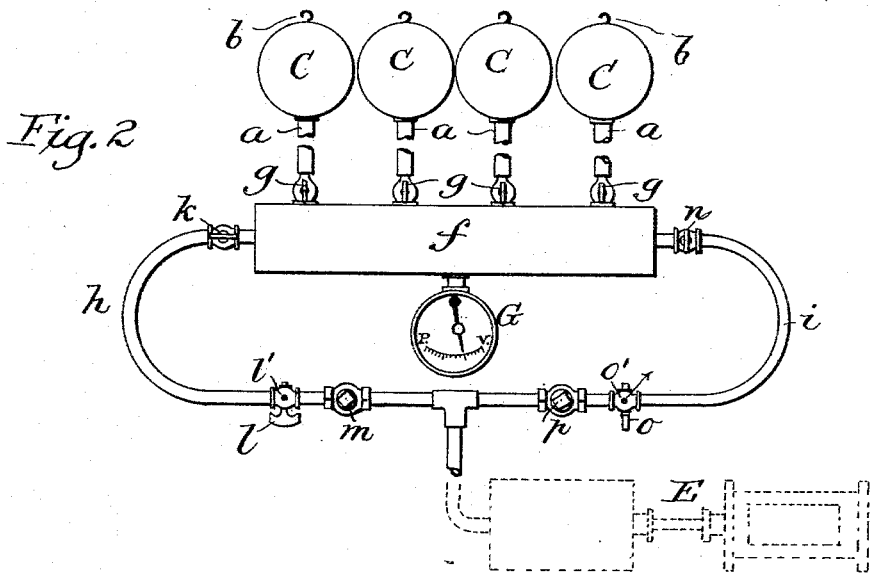
Figure 3:
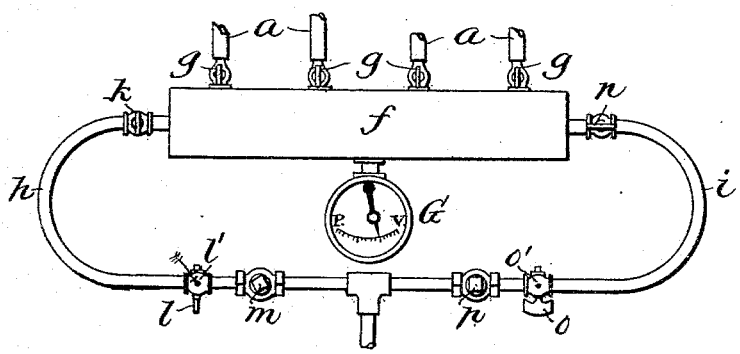
Figure 5:
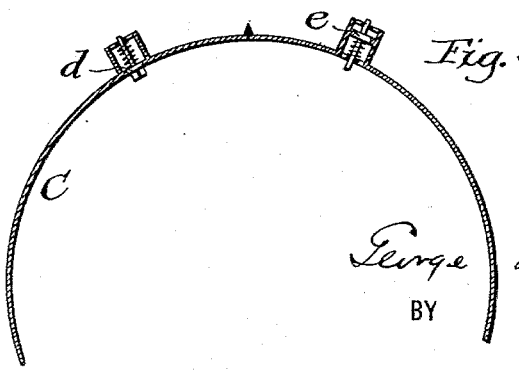

Figure 1 is an elevation of a sunken vessel to which the floats are attached with a boat containing the apparatus for manipulating said floats. Fig. 2 is a diagram in elevation of the general connections of the apparatus, arranged to exhaust the floats of air and be filled with water so that they may sink to the sunken vessel. Fig. 3 is a similar diagram in elevation, the connections being arranged to cause the expulsion of the water from the floats and fill them with air, so that their buoyance will raise the vessel or other object to which the floats are attached to the surface. Fig. 4 is an enlarged sectional elevation of the apparatus. Fig. 5 is an enlarged sectional detail of one of the floats showing particularly the valves thereof.

Referring to said drawings, it will be understood that the improved apparatus is particularly adapted to the raising of sunken vessels and the like from the bottom of the water, a vessel A being represented in Fig. 1 on the bottom of a body of water, and the apparatus being carried by and connected with a boat B floating on said water.

The apparatus in the main consists of one or more floats or hollow floating bodies C adapted for connection with the sunken vessel A or other object to be raised, such floats having connection with the exhausting and compressing apparatus D carried by the boat B.

The floats C are preferably in the form of hollow spheres each connected by a flexible pipe or tube $a$ with the apparatus D. Each float is provided with a hook or other attaching means $b$ arranged to engage with certain eyes or other devices with which the sides of a vessel are provided or with any other part of the object to be raised. The floats C are each provided with an outlet-valve $d$, and an inlet-valve $e$, (see Fig. 5,) through the inlet-valve of which water may be drawn to fill the float so that it will sink to the vessel to be raised, and through the outlet-valve such water may be expelled in the operation of filling the float with air to raise the vessel.

The several floats C are connected through the pipes or tubes $a$ with a common chamber $f$, each pipe being controlled by a suitable opening and closing cock or valve $g$, by which one or more may be closed or opened as the case may be, so that the air-pressure shall be confined to any one or more of the floats, as may be desired. The chamber $f$ in turn is connected by pipes $h$ $i$ with a compressor or pump E, by means of which the air may be exhausted from the floats or any one or more of them to fill them with water, and by which the water may be expelled from the floats or any one or more of them and be filled with air. The pipe $h$ is provided with opening and closing cocks or valves $k$ $l$ and a check-valve $m$, and the pipe $i$ is similarly provided with cocks or valves $n$ $o$ and check-valve $p$. Each of the cocks or valves $l$ and $o$ is provided with an air-orifice $l'$ $o'$, the opening in the plug of the cock being arranged at the proper time to register with said air-orifice in the one case, with the orifice $l'$ to permit the compressor or pump E to draw in air without drawing from the chamber $f$ and the connected floats C, as in Fig. 3, when in the act of forcing air into said floats, and in the other case to expel air through the orifice $o'$, as in Fig. 2, in exhausting air from the floats to allow water to fill such floats.

In the arrangement and adjustment of the cocks and valves shown in Fig. 2 the apparatus is in the act of exhausting air from the floats C, it being understood that at such time the floats are in the water, so that the air exhausted therefrom will be replaced by water entering past the inlet-valve $e$. In this operation the cocks $k$ and $l$ of the pipe $h$ are open and the cocks $n$ and $o$ of the pipe $i$ are closed, the air-inlet orifice $l'$ being closed and the air-outlet orifice $o'$ being open. When the compressor or pump E is operated, the air will be exhausted from one or all of the floats C, depending upon how many of the cocks $g$ are open drawing the air by the pipes $a$, chamber $f$, and pipe $h$ past the check-valve $m$, and discharging such air past the check-valve $p$ through the air-outlet orifice $o'$ to the atmosphere. This exhausting of the air from the floats C will permit water to flow therein through the inlet-valves $e$ to fill such floats and cause them to sink to the bottom of the body of water, so that they may be attached to the sunken vessel or other object to be raised. When this attachment has been effected, the cocks $k$ and $l$ of the pipe $h$ are closed, as in Fig. 3, opening the air-inlet orifice $l'$, and the cocks $n$ and $o$ of the pipe $i$ are opened, closing the air-outlet orifice $o'$. The compressor or pump E then being operated, air will be drawn in by the orifice $l'$ and forced past the check-valve $p$, pipe $i$, chamber $f$, and pipes $a$ to each of the floats C to expel the water therein out by the outlet-valve $d$ of the floats. As the water is expelled and the air takes its place the several floats are rendered buoyant and if the proper number and capacity of floats have been connected with the sunken vessel such vessel will be caused to rise with the floats to the surface of the water to be otherwise handled and repaired. When the floats are sunk to the sunken vessel by the weight of the contained water, the inlet-valve $e$ will be held closed by the weight of the water within the float and the other valve $d$ will be likewise held closed by the pressure of the water on the exterior of the float. As soon as the compressor is operated to expel the water contained by the float such water will pass outward by the valve $d$, which opens against the exterior water-pressure, and this same pressure after the water is all expelled therefrom will also act to hold the air which has taken the place of the water in the float.

By using the two pipes $h$ and $i$ it is possible to employ a check-valve in each pipe to perform different functions, the valve $n$ to hold the air-pressure in the floats after the pump has stopped acting, and the valve $m$ to enable the air to be exhausted from the floats.

From the foregoing it will be seen that an exceedingly simple and effective apparatus is provided by which the desired number of floats may be caused to sink to the sunken vessel and after being attached to such vessel be filled with air to raise the vessel.

The manipulation of the several cocks or valves to open and close them, and vice versa, may be effected each independently or by suitable connections from a single actuating means as will be readily understood.

The chamber $f$ may be large enough to attach as many floats C thereto as may be desired.

The chamber $f$ will have communication with a combined pressure and vacuum-gage G, by which the effective action of the compressor and pump may be seen.

What is claimed is—

1. The combination of a number of hollow floats, a single air chamber to which said floats are independently connected, separate exhaust and supply pipes communicating with said chamber, a suitable check-valve in each pipe, and an exhausting and compressing apparatus, as set forth.

2. The combination of a number of hollow floats, a single air chamber to which said floats are connected, separate exhaust and supply pipes communicating with said chamber, a suitable check-valve and a relief cock in each pipe, and an exhausting and compressing apparatus, as set forth.

3. The combination of a number of hollow floats, an inlet and outlet valve in each float, a single air chamber to which said floats are connected, separate exhaust and supply pipes communicating with said chamber, a suitable check-valve in each pipe, and an exhausting and compressing apparatus, as set forth.

4. An apparatus for raising sunken vessels, comprising an air compressing and exhausting apparatus, two pipes leading therefrom, a hollow float or floats, a single pipe connecting the float with the two pipes, and a combined pressure and vacuum gage connected to said single pipe, as set forth.

5. The herein described hollow spherical float adapted to contain water and also air, and provided with independent and automatically operative inlet and outlet valves, and provided also with a pipe through which air may be forced having connection with the float independent of the said inlet and outlet valves.

In witness whereof I have hereunto set my hand in the presence of two witnesses.

GEORGE H. CHAPPELL.

Witnesses:
W. H. GRAHAM,
E. L. TODD.